US 6,749,300 B2
Jun. 15, 2004

(54) CAPILLARY OPTICAL ELEMENT WITH A COMPLEX STRUCTURE OF CAPILLARIES AND A METHOD FOR ITS MANUFACTURE

(75) Inventor: Aniouar Bjeoumikhov, Berlin (DE)

(73) Assignee: IFG Institut für Gerätebau GmbH, Berlin (DE)

( * ) Notice: Subject to any disclaimer, the term of this patent is extended or adjusted under 35 U.S.C. 154(b) by 98 days.

(21) Appl. No.: 10/096,054

(22) Filed: Mar. 12, 2002

(65) Prior Publication Data

US 2002/0148808 A1 Oct. 17, 2002

(30) Foreign Application Priority Data

Mar. 12, 2001 (DE) .......................... 101 12 928

(51) Int. Cl.[7] ................................ G02C 7/02
(52) U.S. Cl. .................... 351/159; 351/176; 351/160 R
(58) Field of Search ................. 359/642, 643, 359/741, 742; 385/68; 348/345, 354, 355; 250/287, 282, 292; 351/159–161, 165, 168, 169, 176; 438/278; 435/297.4

(56) References Cited

U.S. PATENT DOCUMENTS 5,745,547 A * 4/1998 Xiao ........................ 378/145

2001/0026323 A1 * 10/2001 Bompard ................. 348/345
2003/0044968 A1 * 3/2003 Lafferty et al. ......... 435/287.2
2003/0096220 A1 * 5/2003 Lafferty et al. ............. 435/4

FOREIGN PATENT DOCUMENTS

DE       44 11 330 A1    3/1994
DE       195 27 794 A1   7/1995
DE       197 05 732 A1   2/1997

* cited by examiner

*Primary Examiner*—Ricky Mack
*Assistant Examiner*—Brandi N Thomas
(74) *Attorney, Agent, or Firm*—Norris McLaughlin & Marcus PA

(57) ABSTRACT

The invention describes a capillary optical element with a complex structure of capillaries and a method for its manufacture. To achieve uniform transmission, for example, a lens can be used as a capillary optical element which has a complex structure with channels of different diameter. The channels with the smaller diameter operate effectively at higher energies, channels with intermediate diameters are intended for an intermediate energy range, whereas channels with a large diameter are used in a low energy range. A lens can consist, for example, of three zones: channels with small diameter are used in the central zone, channels with intermediate diameters are used in the intermediate annular zone, and the peripheral zone has channels of large diameters. The number of zones can arbitrary. In addition, a technical process for manufacturing the complex capillary structures is described.

12 Claims, 2 Drawing Sheets

CAPILLARY OPTICAL ELEMENT WITH A COMPLEX STRUCTURE OF CAPILLARIES AND A METHOD FOR ITS MANUFACTURE

BACKGROUND OF THE INVENTION

1. Field of the Invention

The invention relates to a capillary optical element with a complex structure of capillaries and a method for its manufacture. The capillary optical element can be used, for example, in diffractometry, micro-diffractometry, x-ray fluorescent analysis, micro-x-ray fluorescent analysis, and in photoelectron spectroscopy. In all these cases, the light intensity can be increased by several orders of magnitude.

2. Description of the Related Art

Poly-capillary optics has emerged over the past decade as a new important field in x-ray optics. The underlying principle of poly-capillary optics is the channeling of x-rays through multiple total internal reflection on the interior walls of glass capillaries. Curved as well as straight capillaries conduct x-rays along their respective axes. In this way, the propagation direction of the x-rays can be directly influenced.

A bundle of specially formed glass capillaries which are combined into a monolithic structure forms a so-called poly-capillary lens. For example, a bundle of curved capillaries which have their axis on one end oriented towards an x-ray source and on the other end oriented towards an arbitrarily selected point, form a focusing lens, as shown schematically in FIG. 1.

The aperture angle at the input end of the lens can be between 0.1 to 0.3 radians (rad). Each capillary only captures a limited solid angle which is determined by twice the critical angle $\phi_c$ of the outer total reflection and inversely proportional to the energy. For example, for an energy of 10 keV the critical angle $\phi_c$ is only 6 mrad. Accordingly, the linear dimensions of the captured source $S_S$ and of the focal point $S_F$ can be determined by the following formulas:
For the captured source dimension:

$$S_S = (d^2 + (f_S 2\phi_c)^2)^{1/2}$$

and for the size of the focal spot at focus:

$$S_F = (d^2 + (f_F 2\phi_c)^2)^{1/2}$$

wherein d is the diameter of a capillary, $f_S$ and $f_F$ are the focal lengths of the lens on the side of the source and the focus, respectively. The critical angle for total reflection $\phi_c$ depends on the x-ray energy and the material of the capillaries.

Accordingly, the optimal dimensions of the source as well as the size of the focus spot depend on the x-ray energy and on the focal lengths at the input and output side of the system. According to the relationships given above, the size of the source and of the focused radiation beam can be varied over a wide range, for example, from 10 µm to several millimeters, by varying the form and the size of the capillary lens. If the capillary lens is divided in the center and only one half of the lens is used, the capillaries are parallel to each other on one side of the divided lens and can produce a quasi-parallel x-ray beam. Such system is referred to as a "half lens."

It has been observed that radiation originating from a source can be captured very effectively over a specified range of solid angles by a lens and converted either into a parallel beam or focussed to a small spot. For example, the x-ray beam can be focused by a full lens to a focal spot, where the intensity of the focused x-ray beam at the same distance from the source is several orders of magnitude greater than without a lens.

A poly-capillary lens with capillaries of a certain size is transparent over a wide range of energies from a fraction of a keV to several tens of keV. However, the lenses have a different efficiency at different energies, so that the transparency for x-rays increases over a certain energy range and at the same time decreases over other energy ranges. The underlying reason for this phenomenon is that the functionality of a curved capillary is determined by two factors. The first factor is a coefficient γ which indicates how much of the radiation incident on the capillary is captured and is given by the formula $\gamma = \phi_c^2 R/d$. R is here the bending radius of the capillary and d the diameter of the capillary. The coefficient γ has an energy dependence which causes γ to decrease steeply above a certain value of a critical angle $\phi_c = (R/d)^{-1/2}$ (γ=1). Accordingly, capillaries with a smaller diameter are required for channeling x-rays of higher energy. The second factor that influences the functionality of a curved capillary is the transmission coefficient of the capillaries, which is related to the attenuation of the x-rays passing through the capillaries. This factor has a more complex dependence on the energy. The transmission of the low-energy portion of the radiation decreases with decreasing diameter of the capillaries. This is related to the increase in the number of reflections, in particular at low energy, because the critical angle is greater and the reflection coefficient is smaller at lower energy than at higher energy.

A possible remedy for improving the transmission efficiency related to the first factor—which is associated with the coefficient γ that describes the capture of the radiation incident on the capillary—is disclosed in U.S. Pat. No. 5,745,547. However, the solution proposed therein has the disadvantage that the transmission efficiency is enhanced only over a relatively narrow energy range. Many practical application, however, require a more or less uniform transmission over a wide energy range.

However, if both of the factors mentioned above and in particular their interaction are taken into consideration, then the following result is obtained: given the specific diameter of the capillaries, there exists an optimal energy range at which x-ray radiation passes through the capillaries with the highest efficiency. When the diameter of the capillaries is reduced, the optimal energy moves to higher energy values while the transmission at lower energies simultaneously decreases. Conversely, capillaries with a larger diameter show a better transmission efficiency at lower energies. For example, capillaries with a relatively large diameter of approximately 100 µm transmit radiation optimally at keV energies, whereas the intensity of the higher energetic components is strongly reduced. Capillaries with a diameter of approximately 5 µm optimally transmit radiation with an energy of approximately 10 keV. Accordingly, the transmission efficiency for a specified capillary diameter decreases both above and below the optimal energy.

Most practical applications of capillary lenses require a more or less uniform transmission over a broad energy range. For example, x-ray fluorescent analysis requires excitation over the greatest possible range of elements (from sodium to uranium), which can be achieved with a radiation spectrum ranging from several keV to 30 keV. Another example is diffractometry, where depending on the measured material, characteristic radiation of the elements from chromium to silver is required. It would therefore be desirable to employ the same x-ray optics over the entire energy range from 4 keV to 25 keV when changing the anode material (which can be easily changed with a suitable design of the x-ray source that does not require exposing the tube to air).

Another disadvantageous effect, aside from the effect due to inhomogeneous transmission, results from a direct transmission of high-energy radiation through the lens as a whole and through the thin walls of the capillaries. This effect causes a washed-out halo of high-energy radiation (halo effect) in addition to the sharp focal spot in the focal plane from the focussed lower energy beams. This undesirable side effect makes it difficult, for example in x-ray fluorescent analysis, to unambiguously localize the heavy elements whose characteristic lines are excited by high-energy radiation.

SUMMARY OF THE INVENTION

It is an object of the invention to provide a method and a device which enables poly-capillary lenses to transmit uniformly over a wide energy range and which also reduces the direct transmission of high-energy radiation through the lens as a whole and through the thin walls of the capillaries.

According to a particularly advantageous embodiment of the invention, the capillary optical element is made of a complex structure of capillaries, wherein the diameter of the capillaries 12 in the core 6 of the element 1 is smaller than the diameter of the capillaries 10 in the peripheral region 4 of the element 1.

A method for producing capillary optical elements advantageously includes in a first step of drawing capillaries with different diameters and subsequently forming an capillary optical element 1 by arranging the capillaries in such a way that the capillaries with the greatest diameter enclose on the outside those capillaries with the smallest diameter that are located in the interior region of the element 1.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

To achieve a uniform transmission, the present embodiment employs a lens embodied as a capillary optical element which has a complex structure of channels with different dimensions. The channels of small dimension are effective in the range of high energies, channels with intermediate dimensions are intended for the intermediate energy range, whereas channels with large dimensions are used in the low energy range.

The angular aperture of the lens is greater at lower energies than at higher energies, because at lower energies the angle for total reflection is greater than at higher energies. Moreover, the number of reflections for deflecting the radiation is also greater at higher energy, causing higher losses. With increasing distance from the optical axis of the lens, the intensity of the radiation component at higher energy decreases faster than the intensity of the radiation component at lower energy. The distribution of the radiation over the cross section of the lens in the radial direction causes the effective focussing region for high energies to be located close to the axis, while the effective focussing region for low energies is located farther away from the axis.

Figure 2:
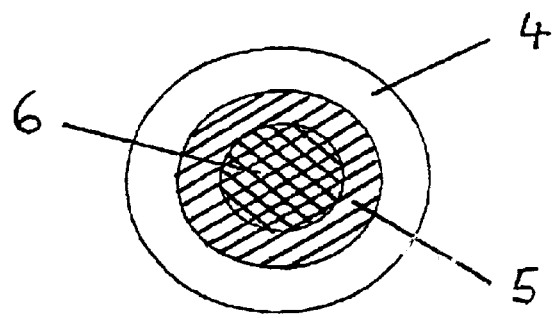
FIG. 2 a cross sectional view of a lens with three different structures.

These results form the basis for the novel zone construction of the poly-capillary lens with channels of different dimensions. For example, a lens can include three zones: channels with smaller dimensions are used in the center zone, channels with intermediate dimensions are used in the intermediate annular section, while the peripheral zone is made of channels with large dimensions. In general, the number of zones can be arbitrary. FIG. 2 shows in cross section an exemplary lens with three zones.

Figure 1:
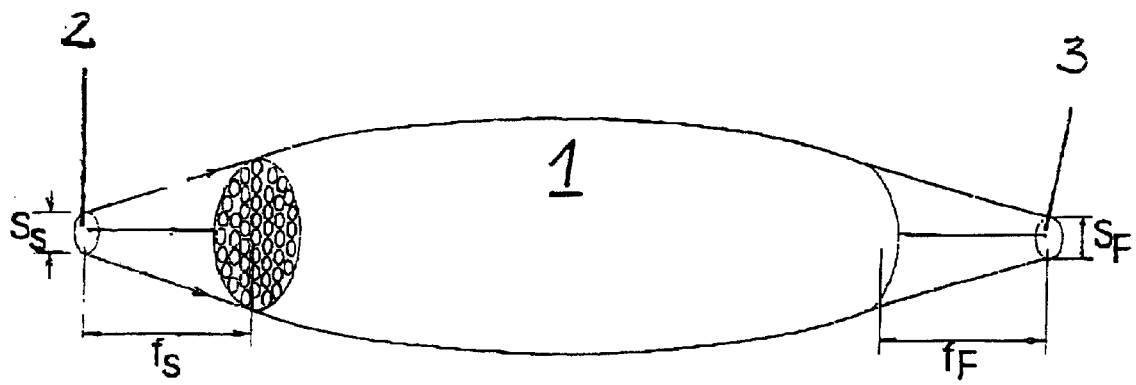
FIG. 1 is a schematic diagram of a poly-capillary lens.

FIG. 1, which shows the schematic diagram of the poly-capillary lens arrangement, also shows the source, such as a x-ray source 2, and in the focal point 3.

The undesirable side effect associated with the direct transmission of high energy radiation through the lens as a whole and through the thin walls of the capillaries can be suppressed by the following solution. The capillaries are fabricated using two different types of glass: a heavy glass with a large fraction of heavy elements, such as lead, and a light glass containing mainly light elements. The light glass forms the inner, totally reflecting surface of the capillary which channels the radiation. The outer heavy glass sheathing of the capillary absorbs the directly transmitted high energy component of the radiation.

FIG. 2 showing the cross-sectional view of the lens, showing three different zones, including the peripheral zone 4 of the capillary optical element with large diameter capillaries; and an intermediate zone 5 with intermediate diameter capillaries and with a zone including small diameter capillaries.

Figure 3:
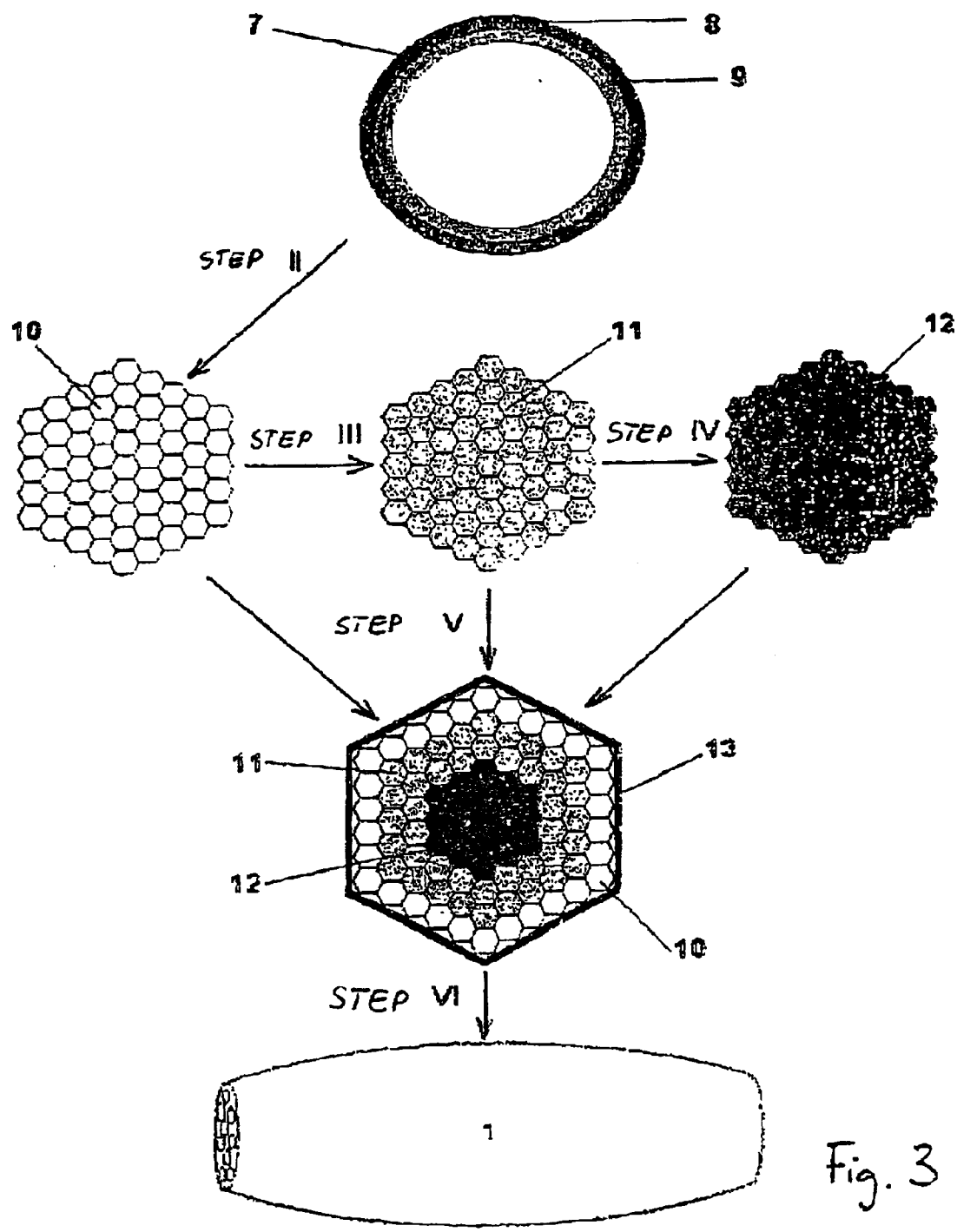
FIG. 3 a schematic flow diagram depicting the fabrication of the complex capillary structures and of the capillaries produced by combining heavy and light glasses.

The technical process for producing the complex capillary structures and the capillaries made by combining heavy and light glasses is illustrated schematically in FIG. 3.

As stated above, FIG. 3 shows a schematic flow diagram depicting the fabrication of the complex capillary structures and of the capillaries produced by combining heavy and light glasses. It depicts the stating capillary 7, with heavy glass wall regions and light glass wall regions 9. Zones of capillaries with larger diameter capillaries 10, intermediate diameter capillaries 11 and smaller diameter capillaries 12 form the initial structure 13 for the lens forming the capillary optical element.

The entire production process includes the following six sequential steps:

(i) Drawing the mono-capillaries which are used as starting material;

(ii) Drawing the poly-capillaries of type 1 from a bundle of mono-capillaries;

(iii) Drawing the poly-capillaries of type 2 from a bundle of type 1 poly-capillaries;

(iv) Drawing the poly-capillaries of type 3 from a bundle of type 2 poly-capillaries;

(v) Assembling the initial structure for producing the lens from the poly-capillaries of the three types; and (vi) Producing the lens and transforming the initial structure into the desired lens form.

The mono-capillaries which are used as starting material are produced by drawing two concentric tubes of different types of glass, wherein the lighter type of glass is placed inside the heavier type of glass. The two glass types should preferably have approximately identical thermal and mechanical properties (thermal expansion coefficient, softening temperature, etc.). The heavy glass type can be, for example, lead glass containing about 70% lead oxide.

The drawing factor at each stage of the production of the poly-capillaries is selected so that the outside dimensions of all three capillary types are similar and/or have a ratio that the poly-capillaries of the three types can form a densely packed structure. The shape of the cross section can be round, hexagonal, quadrangular and the like. FIG. 3 shows an exemplary structure with a hexagonal shape. The poly-capillaries of type 1 are made of capillaries with the largest diameter and form the outer zone of the lens cross section. The poly-capillaries of type 2 with the intermediate dimensions form the intermediate zone. The poly-capillaries of type 3 consist of capillaries with the smallest diameter and form the inner zone. This arrangement produces a multi-zone structure. In general, the number of the drawing steps for the poly-capillaries depends on the number of the desired zones.

Assembly of the lens with the aforedescribed structure can be completed, for example, by using one of the two conventional methods: the lens can be formed by either drawing or compressing the initial structure.

The invention is not limited to the illustrated and described embodiments. It would also be possible to arrive at other embodiments by combining or modifying the aforedescribed features, without deviating from the scope of the invention.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A capillary optical element with a complex structure of capillaries, comprising
   a plurality of capillaries having each a diameter, wherein the capillary comprises a core and a peripheral region, and wherein the capillaries having a smaller diameter form the core, and the capillaries having a larger diameter form the peripheral region.

2. The capillary optical element of claim 1, further comprising a plurality of zones and wherein the core capillaries form a first zone and wherein the peripheral capillaries form a second zone.

3. The capillary optical element of claim 2, wherein the plurality of zones comprises three zones.

4. The capillary optical element of claim 3, wherein the third zone comprises capillaries with an intermediate diameter.

5. The capillary optical element of claim 1, wherein the walls of the capillaries are made of at least two different materials or of a material with different properties.

6. The capillary optical element of claim 5, wherein the materials have approximately identical thermal and/or mechanical properties.

7. The capillary optical element according to claim 5, wherein the walls of the capillaries comprises an inside wall and an outside wall and the interior wall is made of light glass and the outside wall is made of heavy glass.

8. A method for producing capillary optical elements, comprising the steps of:
   drawing capillaries of different diameters;
   forming a capillary optical element by arranging the capillaries such that the capillaries with a large diameter surround the capillaries that are located on the side having a small diameter.

9. The method of claim 8, wherein a starting capillary drawn comprises of a compound material, and an interior wall is formed of a light glass and the outside wall is formed of a heavy glass.

10. The method of claim 8, wherein the capillaries with the small diameter are formed from the capillaries with large diameter by bundling and subsequently drawing the capillaries with large diameter to form a capillary bundle, with the capillary bundle being optionally bundled and drawn again.

11. The method of claim 8, wherein the capillary optical element is subsequently reshaped.

12. The method of claim 11, wherein the reshaping is accomplished by drawing or compression.

\* \* \* \* \*